United States Patent [19]

Ripphahn et al.

[11] 4,120,205

[45] Oct. 17, 1978

[54] DEVICE FOR THE REPEATED REPRODUCIBLE DELIVERY OF DEFINITE VARIABLE AMOUNTS BY VOLUME

[75] Inventors: Johannes Ripphahn; Ernst Kriegbaum, both of Darmstadt, Fed. Rep. of Germany

[73] Assignee: Merck Patent Gesellschaft mit beschrankter Haftung, Fed. Rep. of Germany

[21] Appl. No.: 816,977

[22] Filed: Jul. 19, 1977

[30] Foreign Application Priority Data

Jul. 22, 1976 [DE] Fed. Rep. of Germany ....... 2632970

[51] Int. Cl.[2] .......................... B67D 1/10; G01N 1/14

[52] U.S. Cl. .................................... 73/425.6; 222/148

[58] Field of Search ........................ 73/425.6, 425.4 P; 222/309, 148

[56] References Cited

U.S. PATENT DOCUMENTS

| | | | |
|---|---|---|---|
| 1,747,523 | 2/1930 | McCormick | 73/425.6 |
| 2,916,057 | 12/1959 | Carle et al. | 222/309 X |
| 3,162,217 | 12/1964 | Poli, Jr. et al. | 222/309 X |
| 3,232,117 | 2/1966 | Gilmont | 73/425.6 |
| 3,343,539 | 9/1967 | Moorhouse | 222/309 X |
| 4,023,716 | 5/1977 | Shapiro | 73/425.4 P X |

*Primary Examiner*—Daniel M. Yasich
*Attorney, Agent, or Firm*—Millen & White

[57] ABSTRACT

A combined micrometer screw and syringe assembly with variable predeterminable settings providing for the repeated, exactly reproducible delivery of predetermined variable volumetric amounts of liquid from the syringe but with permissive interim availability of the entire volume of the syringe for rinsing and cleaning thereof without altering any predetermined setting for the definite amount to be delivered therefrom.

11 Claims, 5 Drawing Figures

DEVICE FOR THE REPEATED REPRODUCIBLE DELIVERY OF DEFINITE VARIABLE AMOUNTS BY VOLUME

BACKGROUND OF THE INVENTION

This invention relates to a device for the repeated reproducible delivery of specific variable amounts by volume of liquid, whereby, between deliveries of repeated reproducible definite amounts by volume of liquid, the total delivery volume of the device can be made accessible for cleaning as becomes necessary without altering the prior adjustment of the definite repeated amount to be delivered. The device can be employed with the advantage for the delivery of very small amounts by volume, e.g., in the microliter or preferably in the nanoliter range. The device can thereby be preferably utilized for the application of small exactly determinable amounts of liquid on to plates for high-performance thin layer chromatography (HPTLC).

In thin layer chromatography, it is conventional to apply small amounts of liquid by the use of syringes or microcapillaries to the thin layer plate. The application of amounts of liquid is thereby possible with sufficient exactitude down to amounts of about 100 nl. (=0.1μl.) Due to the development of high-performance thin layer chromatography (HPTLC), which permits extremely small amounts of substance to be determined quantitatively, the necessity has arisen to apply amounts by volume in the range of 5 to 1000 nl. exactly and reproducibly. For this purpose, a device is known in which the piston of a 1 μl. syringe is connected with a micrometer. By rotation of the micrometer screw, the syringe piston can be moved a precise distance which corresponds to a precise nanoliter amount.

However, this device has several disadvantages. For example, the delivery of the liquid is very slow, since the movement of the syringe piston takes place by rotation of the micrometer screw cut with an extremely fine thread. If identical volumes are to be delivered repeatedly, although in principle it is possible to rotate the micrometer screw each time by the same amount (e.g., from 0.00 to 2.73 mm., then from 2.73 to 5.46 mm., then from 5.46 to 8.19 mm. etc.), apart from the laborious calculation of each successive value (and the possible source of error involved therewith), in this method, not only syringe errors but also micrometer screw errors (variations) are involved. Moreover, a rapid sample change with intermediate rinsing of the syringe is not possible with this device.

Thus, there exists the need for a device which permits definite, preferably very small amounts by volume to be delivered repeatedly and with reproducible exactitude and, between deliveries, which permits the total delivery volume of the syringe for a cleaning or rinsing procedure as it becomes necessary, whereby the once adjusted volume value to be dispensed thereby remains fixed.

SUMMARY OF THE INVENTION

This problem is solved by the present invention, which provides a device for the repeated, reproducible delivery of definite, variable amounts by volume, comprising a syringe assembly movably but arrestably mounted in a clamping collar and a micrometer screw which is securely connected with a mounting, such that the syringe and the micrometer screw are arranged movably with regard to one another and in the dosing position along a common axis, and with a releasable stop which enables the utilization of the maximum stroke of the syringe piston for cleansing without alteration of the adjustment of the micrometer screw.

According to other embodiments, the utilization of the maximum stroke of the syringe piston is possible by a syringe or micrometer screw swingably arranged with the two axes remaining parallel to one another or with the syringe or micrometer screw arranged rotatably or tiltably, whereby between the two axes there can be formed an angle of at least 20° to 30°.

In the especially preferred embodiment, the micrometer screw can be displaced along the axis of the syringe, whereby the end points of this displacement distance are exactly fixed. Such an embodiment especially advantageously is one in which the syringe is arrestably mounted in a guide collar, with the syringe piston provided with a piston guide movable in the guide collar, which is fixedly connected with a central tube which contains a push rod displaceably movable by the micrometer screw and with the mounting of the micrometer screw enveloping the central tube like a collar so that it can be displaced a predetermined distance and can be fixed in the two end points of this displacement distance.

In this especially preferred embodiment, the end points of the displacement distance of the mounting are fixed with regard to the central tube in the manner of a bayonet catch and in the rinsing position additionally by a ball catch.

According to further preferred embodimental forms, the push rod is provided on both ends with hardened balls and is kept in contact with the micrometer screw by a spring.

This preferred embodiment of the new device is illustrated in the Figures, in which.

Figure 1:
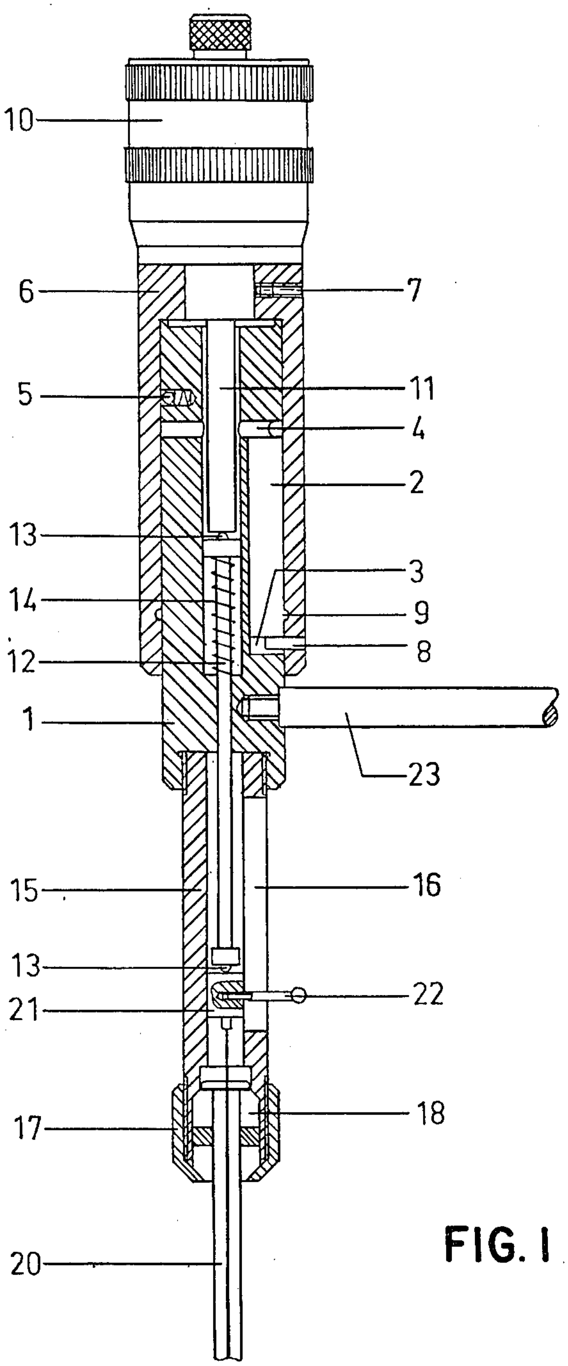
FIG. 1 shows a side view of the dosing device, partly in section, in the dosing position.

The central tube 1 has a slot 2 milled therein with transverse end points 3 and 4. A collar-like mounting 6 includes a depending skirt portion and has a setscrew 7 therein for mounting the micrometer 10, and 8 a pin adjacent the lower end of the skirt portion projecting inwardly for movement in the slot 2. A trough-like annular cut-out 9 in the skirt portion of the mounting 6 receives ball catch 5. The micrometer 10 with its spindle 11 as abutment means are movable in an axial direction and constitute a micrometer screw assembly. A push rod 12 has hardened balls 13 set therein on both ends. A spring 14 presses the push rod 12 against or toward the spindle 11. The guide collar or sleeve 15 has a slot 16 therein and is fixed to tube 1. A screw cap 17 and a clamping collar 18 with partial grooves 19 therein mount the cylinder of the microliter syringe or syringe assembly 20 and included piston. A piston guide 21 connected to the syringe piston is reciprocable in sleeve 15 and has a hand grip 22 projecting outwardly through the slot 16. Rod 23 is for mounting the device.

The central tube 1 is fixedly connected with rod 23 and can thus easily be fixed e.g., onto a stand. Also fixedly connected with the central tube 1 is the guide collar 15 in which the piston guide 21 can be freely moved in axial direction with the help of the hand grip 22 projecting outwardly through the slot 16. With this axial movement, the syringe 20 can be filled and emptied. The syringe 20 can, after loosening of the screw cap 17, easily be displaced in the axial direction but, by screwing on of the screw cap 17, is fixed by the clamping collar 18 in the desired position. The mounting 6, in which the micrometer 10 is fixed by one or more setscrews 7 is inverted in the manner of a collar over the central tube 1 and displaceable relative thereto. However, the extent of this displacement is limited by the pin 8 traveling in the slot 2 constructed in the manner of a bayonet catch. The mounting 6 can be fixed by rotation with the pin 8 forced or clamped in the end portions 3 or 4.

The device is operated as follows:

a) Calibration

The mounting 6 is present in the FIG. 1 position, in which the pin 8 engages in the lower end point 3 of the slot 2. The micrometer 10 is brought into the 0.00 position. The spindle 11 and thus also the push rod 12 pressed against the spindle by the spring 14 is then present in the position which is closest to the syringe 20. After the screw cap 17 is loosened, the syringe 20 is pushed upwardly until the piston guide 21 impinges against the lower ball 13 or stop means of the push rod 12 and is there fixed by screwing on of the screw cap 17. Due to the hardened balls 13, this point is precisely adjustable.

The micrometer screw is next turned so that the spindle 11 and the push rod 12 move away in the axial direction from the syringe 20 until the piston guide 21 can be displaced upwardly to such an extent that precisely the unit volume of the syringe, e.g., 1.00 μl., is indicated on the syringe scale on the cylinder. By reading off of the value then adjusted on the micrometer, one obtains the relation of μl. to mm., e.g., 1.00 μl. corresponds to 48.3 mm.

If, in the case of reaching the maximum measurement range of the micrometer (e.g., 50.00 mm.), the end of the syringe scale is not yet reached, then one reads in this position the value reached on the syringe scale and thus also obtains the relation of μl. to mm., e.g., 50.00 mm. corresponds to 0.975 μl.

b) Dosing

The mounting 6 remains in the position described in a). After the relation of μl. to mm. or of nl. to mm. is known, the desired volume amount can be adjusted on the micrometer 10. The play of the piston guide 21 between the lower stop on the syringe 20 and the upper stop on the ball 13 of the push rod 12 is then exact so that the calculated amount by volume is drawn up or discharged therefrom by the shifting or axial movement of the piston guide 21 and attached portion relative to the syringe 20. In this way, the once adjusted volume can be drawn in or discharged as often as desired. This dosing position is shown in FIG. 1.

c) Rinsing

Figure 2:
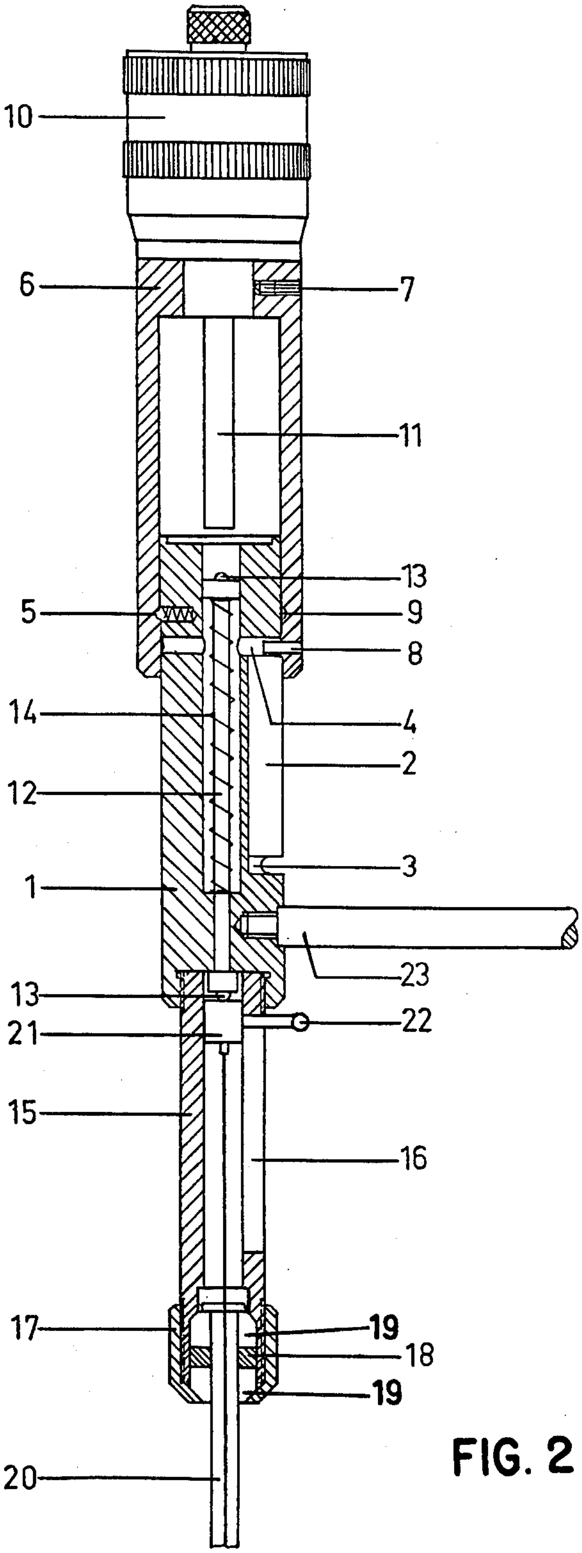
FIG. 2 shows a side view of the dosing device, partly in section, in the rinsing position.
Figure 3:
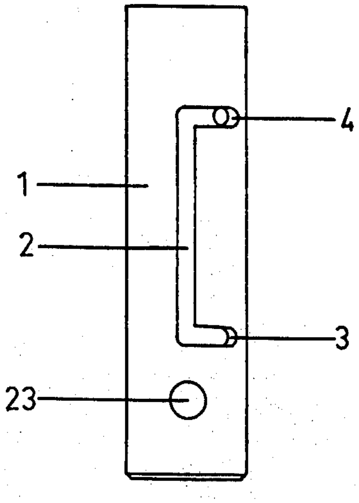
FIG. 3 shows a side view of the central tube with the slot designed as a bayonet catch.
Figure 4:
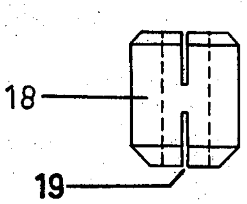
FIG. 4 shows a side elevation of the clamping collar.
Figure 5:
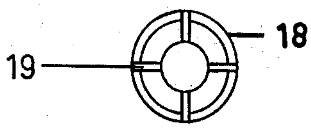
FIG. 5 shows a bottom view of FIG. 4.

The total syringe volume is made available for a necessary rinsing procedure, e.g., in the case of a change of sample, without having to change the value adjusted on the micrometer. For this purpose, the mounting 6 with the pin 8 is merely loosened from the stop 3 by gentle rotation and pushed upwardly. The pin 8 thereby moves in the slot 2. Upon reaching the upper end point of the slot 2, the mounting 6 is again located by gentle rotation, whereby not only does the pin 8 engage into the upper end point 4 but also the ball catch 5 engages in the trough 9. This position is shown in FIG. 2. The piston guide 21 can now be moved unhindered over the whole length of the guide collar 15.

After rinsing, the mounting 6 is again brought into the dosing position so that the pin 8 again engages in the lower end point 3 of the slot 2 and one can then, without further manipulation, deliver from the new sample exactly the same amount by volume as before the rinsing.

The amounts by volume delivered by the new device are per se not limited but are solely dependent upon the volume of the syringe 20. Since, however, sufficient precise devices for the delivery of larger amounts by volume, are known, the new device is advantageously used for the delivery of very small amounts by volume, e.g., in the nanoliter range, in which case a commercially available 1 μl. syringe can be used as syringe 20.

The dimensions of the new device depend, in the first place, upon the type of syringe employed. In this case, the length of the syringe body from the 0.0 μl. marking up to the marking for the maximum volume (i.e., the scale length) is particularly determining since, on the one hand, the guide collar 15 must be at least as long in order that the piston guide 21 can perform the maximum stroke and, on the other hand, the length of the central tube 1 must be related thereto since the push rod 12 needs the same movement play volume. Furthermore, the length of the slot 2, or the distance of the two end points 3 and 4, must be about equal to the scale length and, finally, the micrometer 10 must be so related to the syringe 20 that the maximum measurement range of the micrometer 10 is about equal to the scale length of the syringe 20.

If the scale length of a microliter syringe amounts to a few centimeters, e.g., 5 to 6 cm., then there results a total constructional length of the device of about 20 cm. or, with a mounted syringe, up to the end of the canule, of about 30 cm.

As a syringe 20, there can, in principle, be used any commercially available microliter syringe. Such syringes are obtainable in sizes of 1 to 500 μl. However, a 1 μl. syringe is preferably employed since with such a syringe amounts by volume can be dosed in the nanoliter range, as is necessary in the case of HPTLC. The micrometer 10 can also be a commerically available part which is so selected that the measurement range corresponds approximately with the scale length of the syringe employed.

The other parts, such as the central tube 1, rod 23 and piston guide 21, which can readily be produced in accordance with the description and drawings, are preferably made from rust-free stainless steel, whereas the mounting 6, guide collar 15 and screw cap 17 are, e.g., preferably of nickeled brass. On the other hand, the clamping collar 18 can be formed from a synthetic resin, preferably PVC. The push rod 12 itself can be a soft metal, e.g., brass, but the balls 13 applied to both ends are preferably a hard metal, e.g., hardened stainless steel.

From the statements in the description and the preferred embodimental form shown in the drawings, one skilled in the art can easily deduce the production and manner of functioning of the device according to the invention.

Thus, according to this invention, a device is provided which permits definite, variable amounts by volume, preferably in the nanoliter range, to be repeatedly delivered with reproducible exactitude and which permits the total delivery volume of the device to be available for a rinsing procedure, which becomes necessary in the case of a sample change, without the once exactly adjusted delivery value having to be changed. It has thereby been found that, after the rinsing procedure, the previously adjusted delivery volume is again achieved exactly even though, in the meantime, any desired large volumes are drawn into the syringe and delivered therefrom and even though the changeover from the dosing into the rinsing position, and vice versa, takes place very simply and quickly with only a hand grip.

The manner of using the devices constructed according to the other preferred embodimental forms, in which the utilization of the maximum stroke of the syringe piston is made possible in that the syringe or micrometer screw are arranged swingably or rotatably or tiltably, is, in principle, the same as described above. However, in the case of these embodimental forms, some of the above-described parts are omitted. As a rule, one must omit the guide collar in which the piston guide is moved and the stroke of the syringe piston is also directly limited by the spindle of the micrometer screw and not by a push rod arranged therebetween. However, the omission of the guide collar involve the disadvantage that, due to a careless user, the very sensitive syringe piston can become bent or bowed, which can lead to the destruction of the syringe or at least have the result that the syringe piston is no longer moved exactly in the axis formed by the syringe and micrometer, so that the exactitude of the measurements is impaired. This problem also exists when, after the rinsing, the micrometer or the syringe are not again exactly turned back or tilted back or swung back in the common axis.

These possible impairments of the exactitude of measurement can arise to a smaller extent when only a displacement in the axial direction occurs. However, if preciseness of measurement does not play an important part, and a simple and economic solution is desired then such a simpler embodiment of the invention can be used.

What is claimed is:

1. Apparatus adapted for variable predeterminable settings to effect the repeated, reproducible delivery of definite volumetric amounts of liquid, and with permissive interim cleaning of the apparatus without altering the predetermined delivery setting thereof; and comprising a syringe cylinder and piston assembly having a piston with actuating means for the piston; a micrometer screw assembly; mounting means connecting the said assemblies for relative movement therebetween, and stop means adjustably located by said micrometer screw assembly to a pre-selected position for limiting the intake stroke of the syringe piston in accordance with the predetermined setting of the micrometer screw assembly as determined by the preselected volume to be delivered from the syringe cylinder on the exhaust stroke of the syringe piston, and another position upon relative movement of said assemblies with the stop means shiftable to permit full intake and exhaust strokes of the syringe piston, as for interim cleaning or rinsing of the syringe cylinder, without altering the predetermined setting of the stop means by the micrometer screw assembly upon return to the pre-selected position of the assemblies.

2. Apparatus according to claim 1, wherein the mounting means includes central tube means on which a sleeve carrying the micrometer screw assembly is mounted for movement between a position in which the intake stroke of the syringe piston is limited, as preselected, and a position permitting full strokes of the syringe piston.

3. Apparatus according to claim 2, wherein the syringe cylinder is secured by a clamping collar to the lower end of the tube means and within which tube means a syringe piston guide is mounted for controlled sliding movement as actuated by the piston actuating means projecting outwardly through a slot in the tube means.

4. Apparatus according to claim 3, wherein the sleeve carrying the micrometer screw assembly is rotatable and slidable on the tube means and provided with a pin extending into a bayonet type slot with upper and lower transverse slots into which the pin fits at the upper and lower limits of the axial displacement of the sleeve.

5. Apparatus according to claim 4, wherein the upper limit of displacement of the sleeve is additionally fixed by a ball and socket connection between the sleeve and the tube means.

6. Apparatus according to claim 1, wherein the mounting means includes upper and lower connected members each provided with a central longitudinal bore and wherein the micrometer screw assembly includes a spindle projectable into the upper bore and forming at least a part of the stop means.

7. Apparatus according to claim 6, wherein the stop means further includes a push rod interposed between the micrometer screw spindle and the adjacent end of the syringe piston and guided for movement in the upper and lower bores.

8. Apparatus according to claim 7, wherein the push rod is spring urged for one end contact with the micrometer screw assembly, and with the opposite end providing an adjustable contact stop limiting the intake stroke of the syringe piston to the pre-selected position.

9. Apparatus according to claim 8, wherein the push rod is provided with hardened contact balls at opposite ends thereof.

10. Apparatus according to claim 1, wherein the mounting means includes a sleeve carrying the micrometer screw assembly and shiftable relative to the mounting means to initiate release of the micrometer screw assembly from the pre-selected position in which the piston stroke is limited to another position permitting full strokes of the piston.

11. Apparatus according to claim 1, wherein the mounting means includes a sleeve carrying the micrometer screw assembly and shiftable relative to the mounting means with the syringe piston and micrometer screw assembly maintained on a common axis as the micrometer screw assembly is shifted from the pre-selected position in which the piston stroke is limited to another position permitting full stroke of the piston.

* * * * *